July 16, 1957 R. R. ZINDLER 2,799,366
FLUID-OPERATED ANNULAR PISTON-TYPE DISC BRAKE
Filed Dec. 31, 1952 6 Sheets-Sheet 1

INVENTOR.
Roger R. Zindler
BY Robert Cobb
Attorneys.

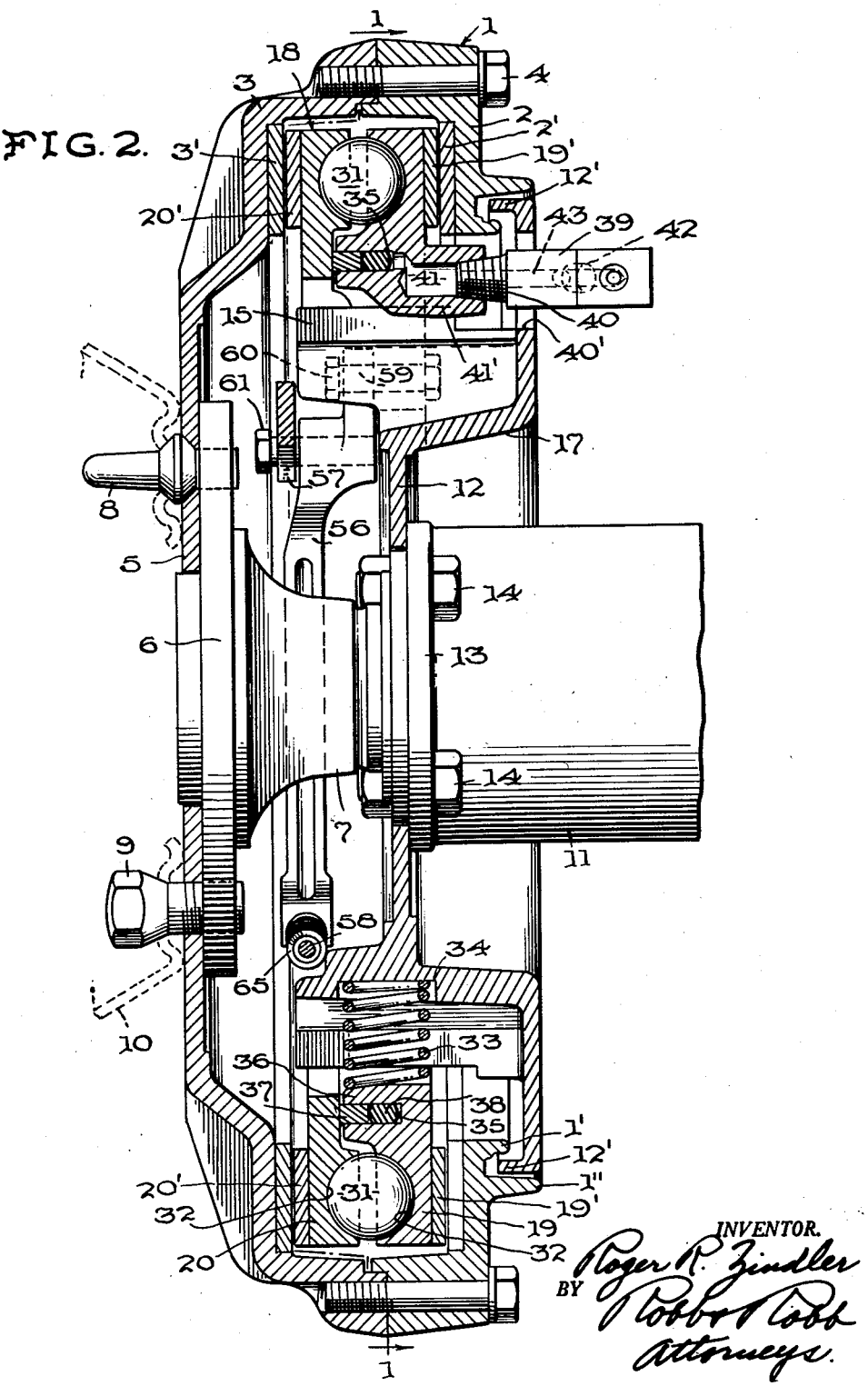

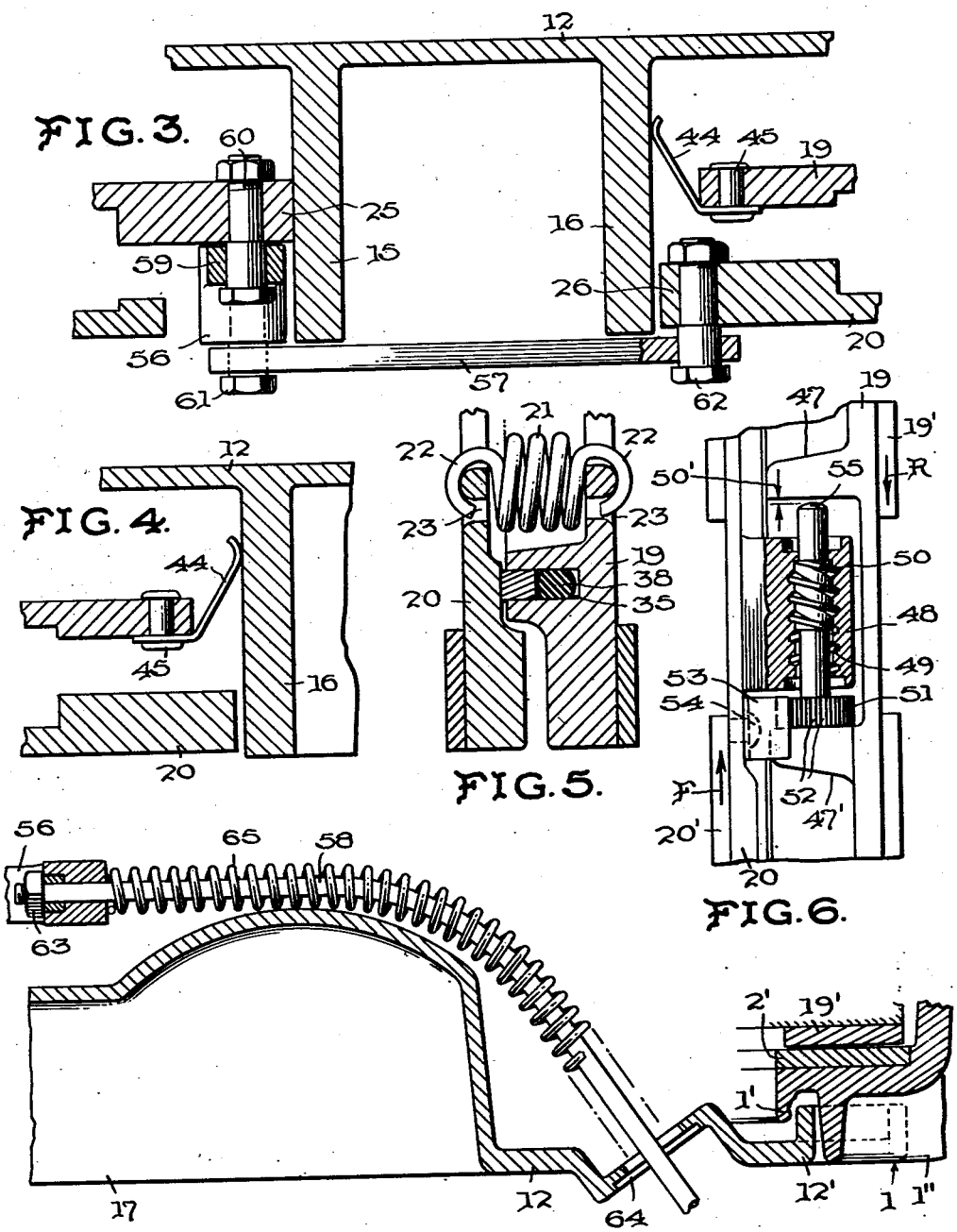

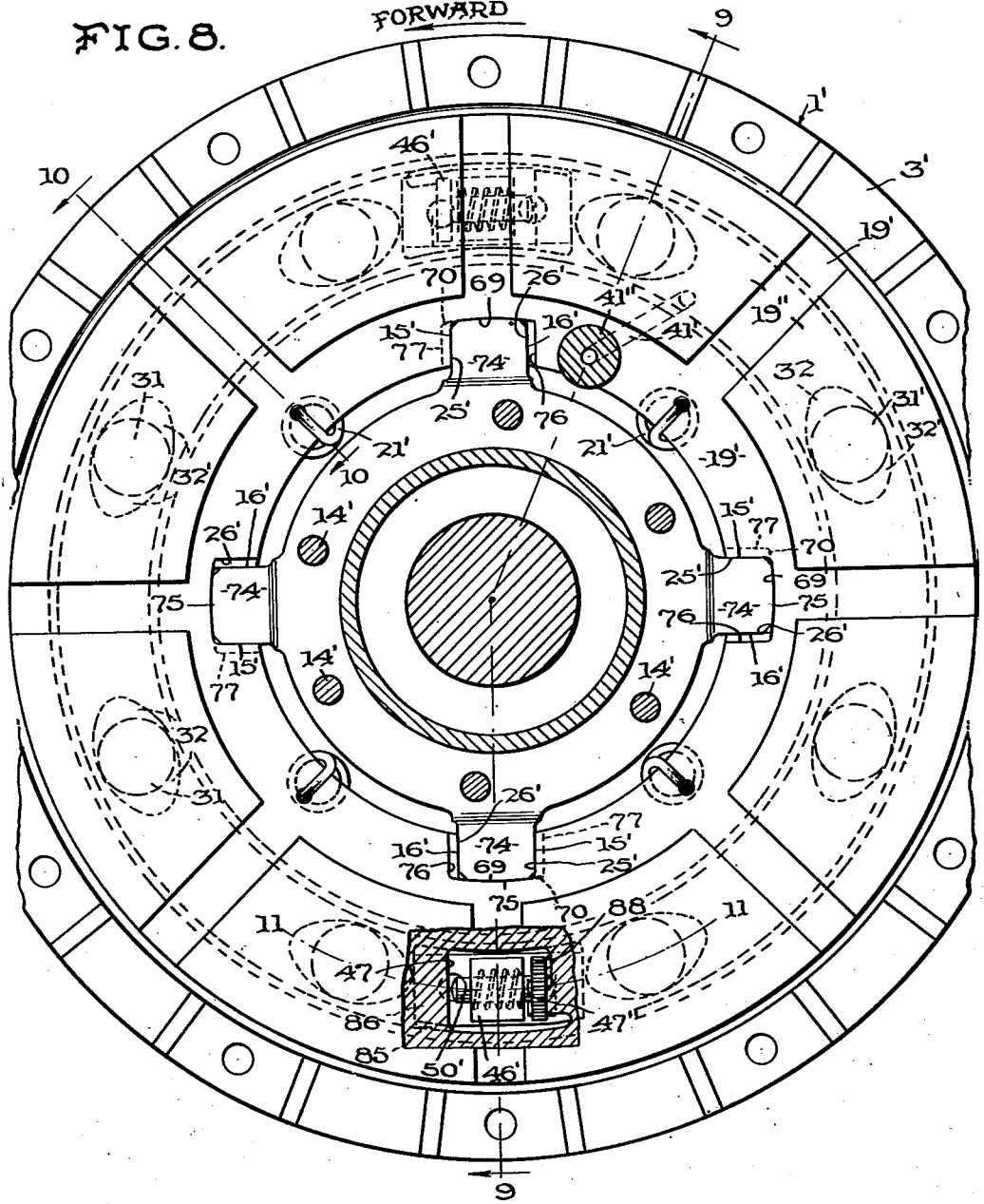

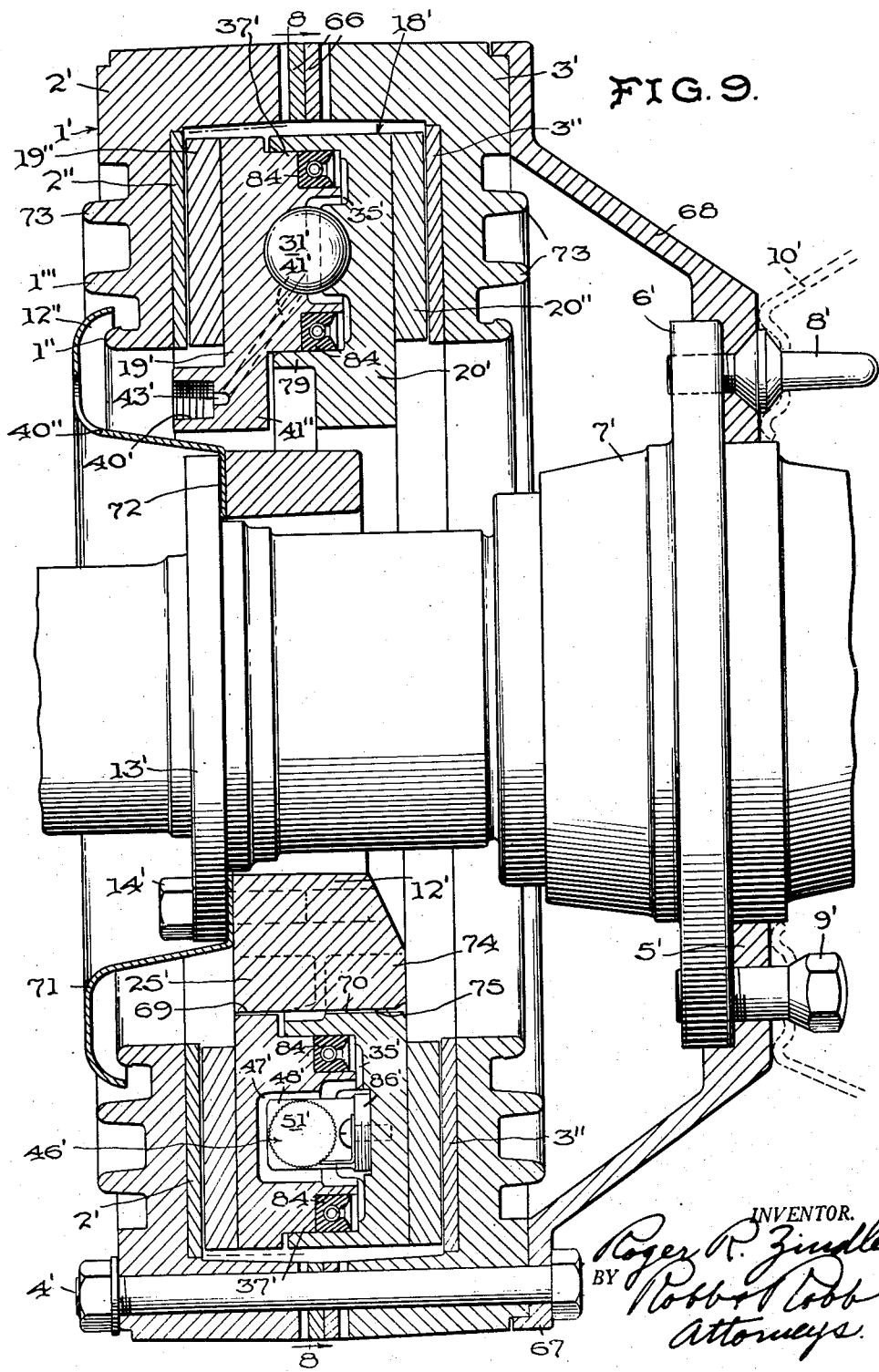

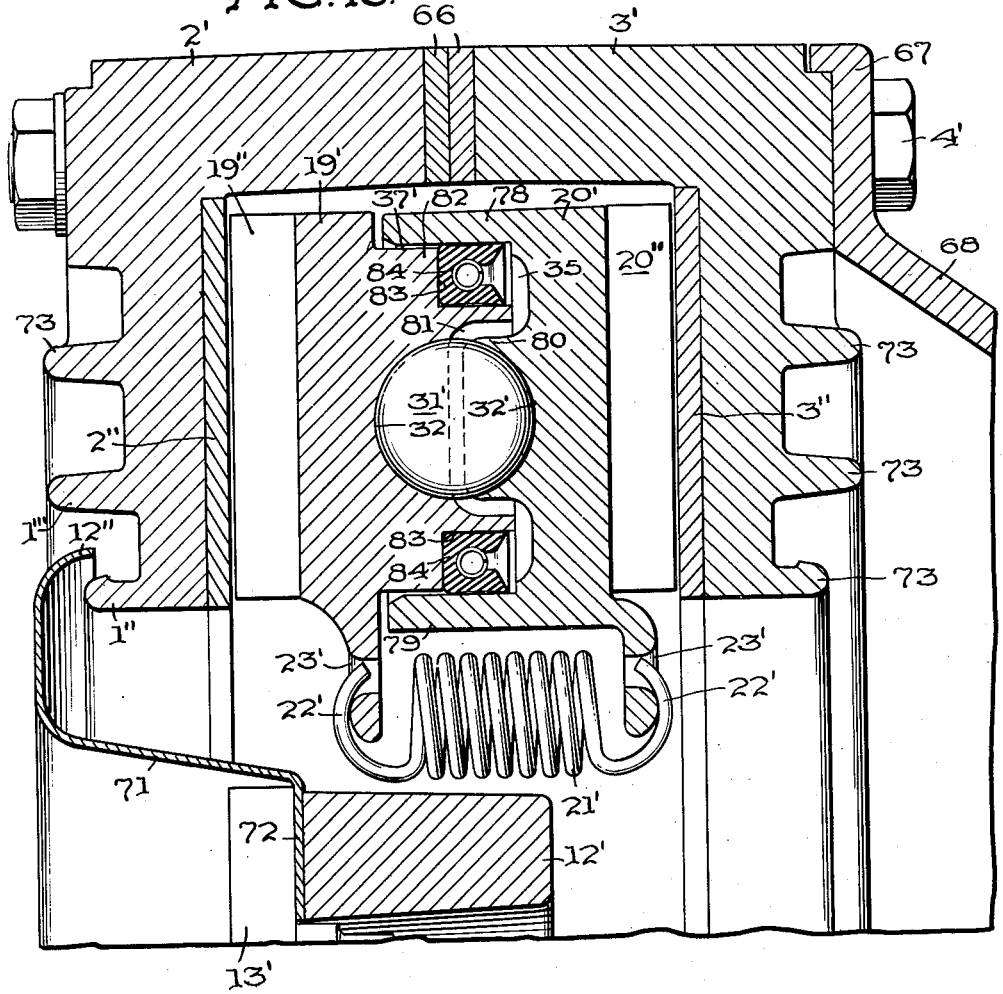
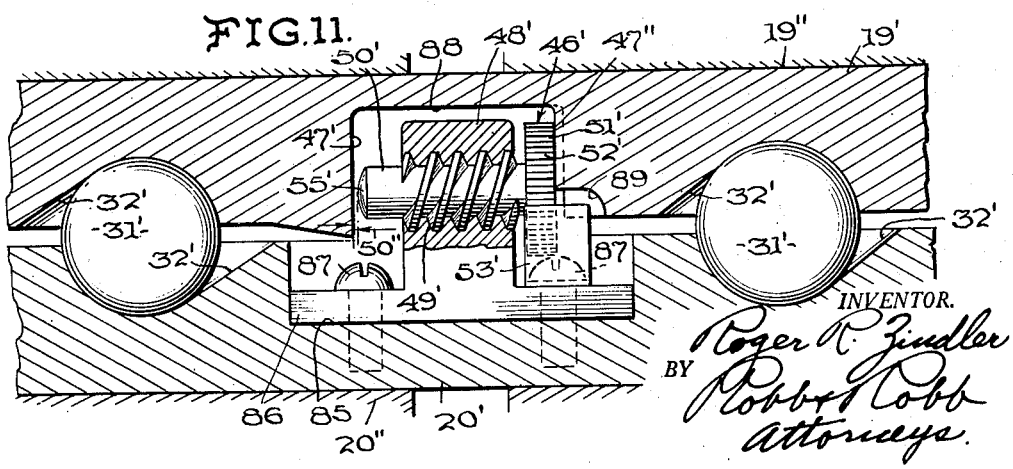

United States Patent Office 2,799,366
Patented July 16, 1957

2,799,366

FLUID-OPERATED ANNULAR PISTON-TYPE DISC BRAKE

Roger R. Zindler, St. Joseph, Mich., assignor, by mesne assignments, to Lambert Brake Corporation, St. Joseph, Mich., a corporation of Michigan Application December 31, 1952, Serial No. 328,909

18 Claims. (Cl. 188—72)

The present invention relates to disc brakes, and more particularly, to improved disc brakes for use on motor vehicles of all sizes and types, said brakes being adaptable to heavy duty automotive equipment, as well as to passenger vehicles and the like.

The general primary objectives of the invention are to provide an improved form of fluid-actuated disc brake in which the operating instrumentalities are of the annular piston type, said brake being so constructed and arranged as to be relatively inexpensive to manufacture, easy to assemble and disassemble, includes parts which are readily interchangeable so as to facilitate service and repair, is self-energizable in either direction of travel of the vehicle, is readily adaptable to either pneumatic or hydraulic operation, includes automatic means for progressively compensating for wear of the friction surfaces of the brake regardless of the direction of rotation of the member to be braked, includes a free-mounted braking disc assembly which is not positively secured to any supporting structure, but instead is slidably mounted on a stationary support so as to be freely shiftable both axially and rotatively, and has means to prevent clocking movements of the discs during forward braking applications, thus obviating objectionable noises which would otherwise be caused by anchoring one of the discs on a stationary part. The latter objective is attained by the provision of anti-clocking means for maintaining one of the discs, preferably the inboard disc, anchored on a stationary part while the brake is inactive, whereby no shifting movement of the anchored disc is required for self-energization of the brake during forward braking.

Specifically, it is an object of the invention to provide a disc brake of the aforementioned type, which comprises a rotatable member to be braked, a stationary support having a plurality of radially extended supporting portions, an inner double-disc assembly freely mounted on said supporting portions, the discs of said disc assembly having a cooperative piston chamber and piston therebetween for shifting the discs axially into frictional engagement with the rotatable member to be braked, camming means between said discs for spreading said discs axially apart responsive to relative rotation thereof, said discs having portions disposed for anchoring engagement with said supporting portions to anchor one disc or the other, depending upon the direction of rotation of the member to be braked, whereby the drag torque of the rotatable member will cause the other disc to clock therewith so as to effect self-energization of the discs by said camming means, resilient means biasing said discs towards each other and maintaining said discs in assembled relation with the camming means therebetween, and cooperative self-adjuster means carried by the respective discs for automatically limiting the return positions of the discs responsive to brake applications so as to automatically compensate for wear of the friction faces of the brake.

A further object is to provide a disc brake of the aforesaid type, which includes auxiliary mechanical operating means pivotally mounted on one of the discs of the double-disc assembly and interconnected with the other disc thereof, for shifting the discs rotatively in opposite directions responsive to pivotal movements of said pivotal means, whereby the discs will be shifted axially by the camming means into braking engagement with the member to be braked.

An additional object is to provide a self-energizing disc brake of the fluid-operated annular piston type which includes means for preventing self-energization thereof when the friction linings have worn down to such an extent that replacement or other service thereof is desirable, but which allows continued operation of the brake responsive to fluid pressure alone, without the benefit of self-energization.

Another object is to provide a disc brake having an inner double-disc assembly, one disc of which is formed on its inner face with an annular piston chamber and a fluid inlet-outlet port extending into the piston chamber, said piston chamber having an annular piston reciprocably mounted therein and operatively engaged with the inner face of the other disc, and self-energizing cam means disposed between said discs.

Still another object is to provide a disc brake having an inner double-disc assembly, one disc of which is formed on its inner face with a relatively large annular piston chamber and an inlet-outlet port extending into the piston chamber, the other disc being formed on its inner face with an annular axial extension constituting a piston shiftable in said piston chamber, sealing means cooperatively engaged with said piston and the walls of said piston chamber, and self-energizing cam means disposed within said piston chamber.

And still another object is to provide a disc brake including an inner double-disc assembly having cooperative annular piston and piston chamber portions on the opposed inner faces of the discs, and also having automatic self-adjuster means disposed within said piston chamber.

Other objects, advantages, and features will be hereinafter described or will become apparent to those skilled in the art, and the novel features of the invention will be defined in the appended claims.

In the drawings:

Fig. 2 is an enlarged view in vertical section, as taken on the line 2—2 of Fig. 1, with the outboard side of the housing in place, a portion of a vehicle wheel being shown in broken lines, and certain of the parts of the assembly being shown in elevation;

Fig. 3 is an enlarged fragmentary view in horizontal section, as taken on the line 3—3 of Fig. 1, certain of the parts being shown in elevation;

Fig. 4 is an enlarged fragmentary view in horizontal section, as taken on the line 4—4 of Fig. 1, certain of the parts being shown in elevation;

Fig. 5 is an enlarged fragmentary view in section, as taken on the line 5—5 of Fig. 1, certain of the parts being shown in elevation;

Fig. 6 is an enlarged fragmentary view, as taken on the line 6—6 of Fig. 1, with a part of the automatic adjuster broken away and shown in section;

Fig. 7 is an enlarged fragmentary view in section, as taken on the line 7—7 of Fig. 1;

Figure 1:
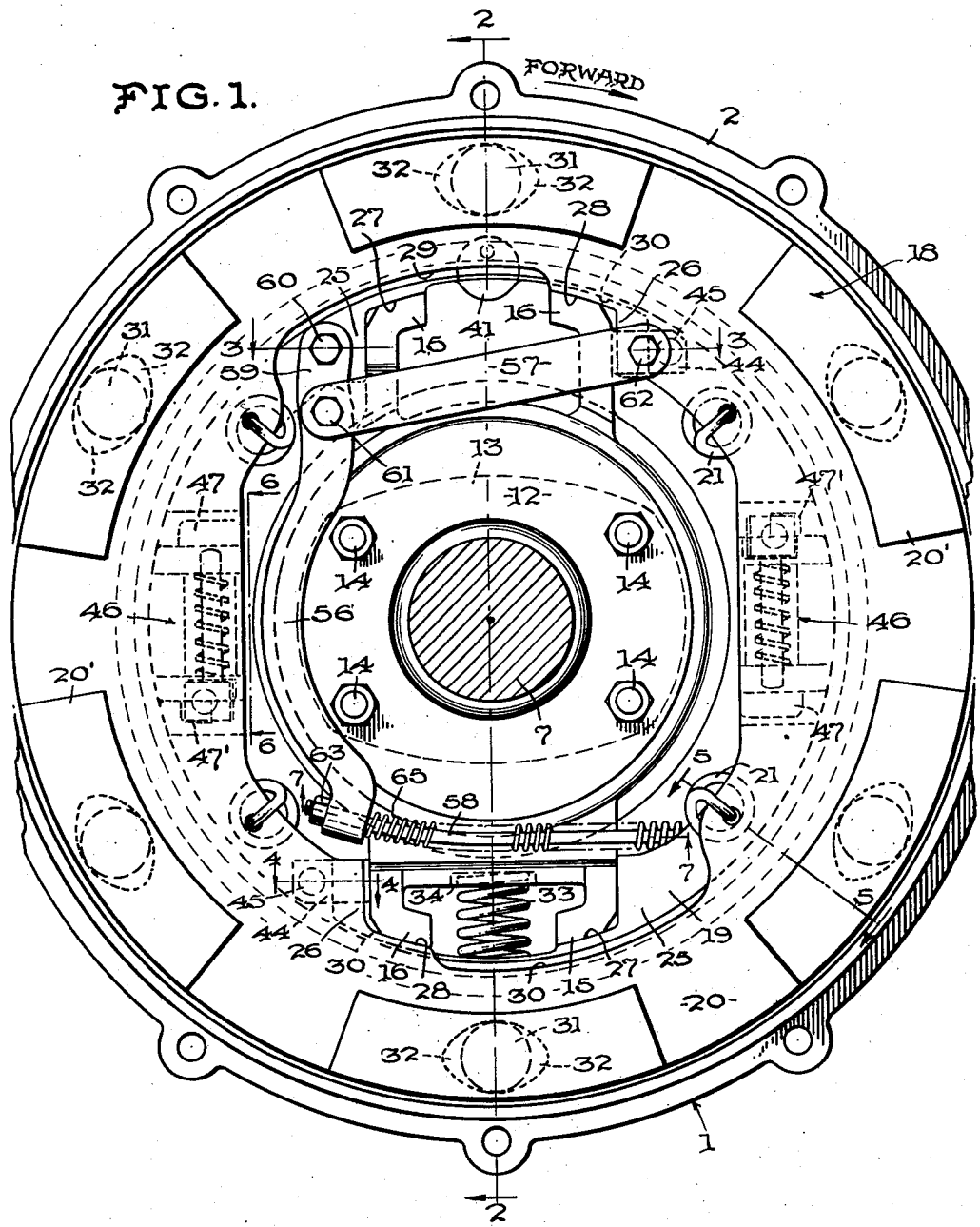
Fig. 1 is a view of one form of brake embodying the present invention, with the outboard side of the rotatable brake housing removed to expose in elevation the interior construction of the brake and its mounting on a right-rear vehicle axle assembly, this view being taken substantially on the line 1—1 of Fig. 2.

Fig. 8 is a view of a modified form of brake embodying the present invention, with the inboard side of the rotatable brake housing removed to expose in elevation the interior construction of the brake and its mounting on a right-rear vehicle wheel-mounting, this view being taken substantially on the line 8—8 of Fig. 9, and having a portion of the inboard disc broken away and shown in section so as to disclose one of the automatic adjusters;

Fig. 9 is an enlarged view in section, as taken on the line 9—9 of Fig. 8, with the outboard side of the housing in place, with a portion of a vehicle wheel shown in broken lines, and with certain of the parts shown in elevation;

Fig. 10 is an enlarged fragmentary view in section, as taken on the line 10—10 of Fig. 8, with certain of the parts shown in elevation; and Fig. 11 is an enlarged fragmentary view in section, as taken on the line 11—11 of Fig. 8, with certain of the parts shown in elevation, and with a part of the automatic adjuster shown in partial elevation.

In the several views of the drawings and in the following detailed description, like reference characters designate corresponding parts.

Referring first to Figs. 1 through 7, there is shown one form of brake embodying the present invention, this brake being illustrated as applied to the right-rear wheel of a wheeled vehicle. In these views, the brake includes a two-part housing 1 adapted to be connected to a rotatable member, and having an inboard housing section 2 connected to an outboard housing section 3 by means of a suitable number of cap-screws 4 or the like. Extending generally radially inward on the outboard housing section 3 is a flange 5 which is adapted to be rigidly connected to a flanged wheel-mounting hub 6 of a vehicle axle 7. Preferably, this connection is made by a centering pin 8 and a suitable number of wheel-mounting screws 9 which are conventionally utilized to secure a wheel 10 to the flange 6. Thus, the housing 1 will rotate with the vehicle wheel, and braking of the housing will brake the wheel and axle.

The axle 7 extends into an axle housing 11 to which a stationary mounting or adapter plate 12 is adapted to be secured. A shouldered flange 13 is formed on the outer end of the axle housing 11, and the central portion of the adapter plate 12 is formed with an opening to fit about and center the same on the shoulder aforesaid, with the plate 12 abutting against said flange 13 and secured thereto by a suitable number of screws or bolts 14 or the like. This adapter plate 12 forms a closure for the housing 1 and has its outer marginal edge formed with an out-turned flange 12' projecting between a pair of spaced flanges 1' and 1" on the housing 1 to prevent foreign matter from entering the housing. At diametrically opposite positions, the adapter plate 12 is provided with a pair of supporting lugs 15, 15 and a second pair of supporting lugs 16, 16, each lug 15 being disposed in adjacent spaced relation to a lug 16, as is clearly shown in Fig. 1. The adapter plate 12 is marginally flared as at 17 in an inboard direction, and the lugs 15 and 16 are preferably located on and are preferably integral with the portion 17 and project in an outboard direction for a substantial distance past the central mounting portion of the adapter plate 12, thus providing the lugs 15 and 16 with a substantial supporting surface on the radially outermost faces thereof for supporting engagement with the discs of an inner double-disc assembly 18.

The double-disc assembly 18 includes an inboard disc 19 and an outboard disc 20, these discs being held together by a plurality of return springs 21 preferably having hooked ends 22, 22 engaged in apertures 23, 23 in the inner peripheral portions of the discs, as best seen in Fig. 5. The inner periphery of the inboard disc 19 is provided with a pair of diametrically spaced anchor lugs 25, and the outboard disc 20 is provided with a pair of diametrically spaced anchor lugs 26 on its inner periphery. Adjacent to each anchor lug 25 on the inboard disc, the inner periphery of the disc is provided with an arcuate bearing surface 27 for supporting engagement with the respective supporting lugs 15 on the adapter plate 12, and adjacent to each anchor lug 26 on the outboard disc, the inner periphery of this disc is also provided with an arcuate bearing surface 28 for supporting engagement with the respective supporting lugs 16 on the adapter plate.

As is best seen in Fig. 1, however, the inner peripheries of the respective discs 19 and 20 are provided with radially outwardly extended depressions adjacent to the bearing surfaces 27 and 28, as designated at 29 and 30, respectively, thus providing clearance space between the inboard disc 19 and the supporting lugs 16 for the outboard disc, and also providing a similar clearance space between the outboard disc 20 and the supporting lugs 15 for the inboard disc.

Interposed between the discs 19 and 20 is a plurality of hardened balls which are seated in opposed, oppositely inclined ramped seats 32 in the inner faces of the discs. Upon initial assembly, these balls 31 are maintained in the deepest parts of the seats 32 by the action of the return springs 21; and when the balls are in such positions, the opposed anchor lugs 25 and 26 on the respective discs are normally spaced from each other for a distance slightly greater than the distance between the faces of the supporting lugs 15, 16 which are opposed to the anchor lugs, due to manufacturing tolerances. For the same reason, the diametrical distance between the radially outermost faces of the supporting lugs 15, 15 and 16, 16 is slightly less than the diametrical distance between the bearing surfaces 27, 27 and 28, 28. Thus, the inner disc assembly 18, held in assembled relation by springs 21, is readily slidable onto and off of the supporting lugs 15 and 16.

Means are preferably provided for eliminating any vertical play between the disc assembly 18 and the supporting lugs 15 and 16. As shown, this means has the form of a coiled compression spring 33, one end of this spring being seated in a seat 34 disposed between the lower supporting lugs 15 and 16 of the adapter plate 12, and the other end of said spring bears against the inner periphery of the inboard disc 19. Thus, the spring 33 biases the disc assembly downwardly and prevents rattling of the discs on the supporting means, particularly when the brake is in a released condition.

The outer, radially extended faces of the discs 19 and 20 are respectively provided with suitable friction lining material, this lining material preferably being in the form of segments 19' and 20' which are bonded to the discs; and the inner opposed faces of the housing 1 are also preferably provided with suitable wear-resistant surfaces 2' and 3' for frictional engagement by the friction linings 19' and 20' of the discs upon axial separation of the discs.

According to one of the features of this invention, the means for establishing frictional engagement of the discs with the housing comprises an annular piston chamber 35 formed in the inner face of the inboard disc 19 and adjacent to the inner periphery thereof. As seen in Fig. 2, the disc 19 is laterally thickened at 36 so as to enable the piston chamber to be of adequate depth. A fluid pressure-responsive annular piston 37 is slidably positioned in the piston chamber 35 and engages the inner face of the outboard disc 20, and a resilient sealing gasket or ring 38 is disposed behind the piston to seal the piston chamber 35 against leakage.

For admitting pressure fluid into the piston chamber 35, a fitting 39 is provided. The fitting 39 has a threaded end 40 projecting through a suitable opening 40' in the adapter plate 12 and engaged in a correspondingly threaded end of a neck 41' on the inboard side of the inboard disc 19, this neck 41' having a port 41 therein establishing fluid communication with the piston chamber 35. Preferably, the fitting 39 is provided with a port 42 adapted to be fitted with a bleed valve, this port 42 intersecting the inlet-outlet port 43 of the fitting (see Fig. 2). Thus, pressure fluid forced through port 41 into the piston chamber 35 will exert a uniform pressure on the discs at all points therearound and will spread the discs axially apart into engagement with the rotatable housing 1.

While the piston chamber 35 is shown as being formed in an integral portion 36 of the disc 19, the portion 36 may be formed as a separate annulus which seats in a complemental annular seat in the outboard face of the inboard disc 19. Such a construction would permit identical discs to be cast for the brakes for both right-hand and left-hand wheels. In addition, a construction embodying a separate annulus in lieu of the integral portion 36, provides better insulation for preventing the actuating fluid from becoming over-heated; and in constructions where high temperatures are a serious problem, additional insulating members may be placed between the annular cylinder and the disc body.

Depending upon the direction of rotation of the housing 1, one disc or the other must anchor on the supporting lugs 15 or 16 therefor in order for self-energizing action of the balls to be effected. Such anchoring of the discs would normally cause a metallic "clunk" or "click" which is objectionable in passenger cars. Therefore, according to one feature of this invention, clocking control means are provided to maintain one disc anchored at all times during forward braking, and this means is preferably applied to the inboard disc 19.

Referring particularly to Figs. 3 and 4, a leaf spring 44 is secured at one end to the disc 19, as by means of a rivet 45 or the like, at the side of the supporting lugs 15 and 16 opposite each of the anchor lugs 25 on the inboard disc 19. The free ends of the springs 44 resiliently bear against the supporting lugs 16, thus biasing the entire inner disc assembly in a clockwise direction, as viewed in Fig. 1, so as to resiliently maintain the anchor lugs 25 of disc 19 anchored against supporting lugs 15.

Means are also provided for automatically compensating for wear of the friction linings throughout the life thereof. In this connection, a pair of adjusters 46 are utilized in diametrically spaced relation to each other, as seen in Fig. 1. The details of these adjusters are best seen in Fig. 6, wherein it will be seen that the inboard disc 19 is provided with a pair of spaced, opposed abutments 47, 47' projecting towards the opposed face of the outboard disc 20, and the outboard disc 20 is provided with a single lug 48 which projects into the space between the abutments 47, 47'. This lug 48 is provided with an axially extended threaded bore 49 in which is threadedly mounted an adjuster screw 50. The screw 50 has an enlarged, flat head 51 which is frictionally engageable with the abutment 47'; and this head 51 is provided with a series of circumferentially spaced serrations or teeth 52 about its margin. A leaf spring dog 53 secured to the outboard disc 20 by means of a screw 54 or the like, engages in the teeth 52 to prevent rotation of the screw in one direction, the screw shown having a left-hand thread and the dog 53, therefore, preventing the screw from turning counter-clockwise or into the lug 48. The opposite or lead end of the screw 50 is rounded, as at 55, so as to offer a minimum of frictional resistance to turning of the screw responsive to thrust thereon from the abutment 47 when the discs are shifting rotatively in the direction of the arrows F and R in Fig. 6. The screw 50 has an over-all length which is slightly less than the distance between the abutments 47 and 47' for a purpose which will appear as the description progresses.

The adjusters at each side of the disc assembly are identical; that is, each screw 50 is mounted in a lug 48 which is carried by the outboard disc 20, and the spaced abutments 47, 47' are carried by the inboard disc; and the lead ends 55 of both screws are directed in the same direction circumferentially; that is, one screw is directed upwardly, and the other screw is directed downwardly, as shown in Fig. 1.

According to another of the salient features of this invention, the brake is preferably provided with mechanical means for shifting the discs relatively rotatably so as to effect spreading of the discs axially apart by a camming action of the balls 31. As is shown in Figs. 1, 2, 3 and 7, this mechanical means comprises a lever 56, a link 57 and a flexible pull-wire or cable 58. The lever 56 is pivotally connected at one end 59 to one of the anchor lugs 25 of the inboard disc 19, as by means of a shoulder bolt 60, this end 59 being offset and being located substantially between the discs 19 and 20, while the body of the lever 56 is so located as to allow the link 57, which is pivotally connected at one end, as by means of a shoulder bolt 61, to the lever 56 at a point inwardly from the end 59, to clear the supporting lugs 15 and 16. The other end of the link 57 is pivotally connected, as by means of a shoulder bolt 62, to one of the anchor lugs 26 on the outboard disc 20, and the free end of the lever 56 is suitably connected to the cable 58, as at 63. The cable 58, being flexible, extends around the lower supporting lugs 15, 16 and the seat portion 34 of the spring-adapter plate 12 and extends through an opening 64 in the plate 12, and a coiled compression spring 65 encircling the cable 58 urges the lever to an inactive position so as to aid in releasing the brake in a manner that is conventional in cable-operated brake actuators.

The operation of this form of brake is as follows:

Assuming that the brake is in a released condition and the wheel 10 and therefore the housing 1 is rotating in a forward or clockwise direction, as indicated by the arrow in Fig. 1, pressure fluid forced into the annular piston chamber 35 will spread the discs 19 and 20 axially apart and into frictional contact with the opposed friction surfaces 2', 3' in the housing, and the inner disc assembly 18 will tend to clock in a forward or clockwise direction, responsive to the drag torque of the housing. However, the inboard disc 19 is anchored by its lugs 25 on the supporting lugs 15 and is held stationary. Therefore, the outboard disc 20 alone will clock with the housing, thus energizing the brake by causing the balls 31 to climb the oppositely inclined, ramped seats 32 and positively cam the discs apart into harder frictional engagement with the housing to effect a powerful braking action.

Release of the fluid pressure in the piston chamber will allow the return springs 21 to disengage the discs from the housing and cause the balls to roll back down the ramps.

As mentioned in the foregoing, the adjuster screw of each adjuster is of a lesser length than the distance between the abutments 47, 47' and thus, a gap 50' is provided between the lead end 55 of the screw and the abutment 47. This gap 50' determines the release or running clearance of the brake, and as long as no appreciable wear of the lining material has occurred, the abutments 47 will apply no force on the ends 55 of the screws during brake application. However, as the linings wear, the discs must shift rotatively relative to one another a greater distance than gap 50' in order for the balls 31 to fully energize the brake. Therefore, under the latter condition, the abutments 47 will engage the screws 50 and progressively cause them to automatically back out of the lugs 48 until the brake is fully applied as wear occurs. On release of the brake, however, the return movements of the discs will be limited to the length of gap 50', because the abutments 47' will engage the heads 51 of the screws, thus limiting the return movements of the discs. The frictional contact between the screw heads 51 and abutments 47', together with the dogs 53 engaged in the teeth 52, will prevent the pressure of abutments 47' on the screw heads 51 from forcing the screws inwardly in the lugs 48. Thus, wear of the friction linings is automatically and progressively compensated for, and the brake need never be adjusted manually. In fact, even when the brake is initially assembled, no manual adjustment is necessary, since a mere single application of the brake will automatically adjust the brake to the proper running or release clearance.

In addition, such adjustment takes place regardless of the direction of rotation of the housing. When the housing is rotating in a rearward or counter-clockwise direction, initial engagement of the discs with the housing will cause the inner disc assembly 18 to clock with the housing until the anchor lugs 26 of the outboard disc engage the supporting lugs 16, and the outboard disc 20 then becomes the stationary disc, while the inboard disc 19 continues to shift rotatively to energize the brake through the camming action of the balls 31. Under such conditions, the disc 19 will shift relative to disc 20 in the direction indicated by the arrow R in Fig. 6, and thus, the lugs 47 will be forced against the ends 55 of the screws 50.

When it is desired to apply the brake by the auxiliary mechanical actuator means for emergency or parking purposes, the cable 58 is pulled to the right, as seen in Fig. 1. This rocks the lever 56 on the bolt 60 and swings the bolt 61 to the right and upwardly about the bolt 60, with consequent axial and pivotal movement of the link 57, thus rotating the discs relative to each other in opposite directions by the toggle action of the end 59 of lever 56 and the link 57. Such relative rotation of the discs will cause the balls 31 to climb the ramped seats 32 to shift the discs axially apart into braking engagement with the housing. If the housing 1 be rotating, the torque transmitted from the housing 1 to the inner disc assembly will effect self-energization of the brake in the same manner as hereinbefore described. Thus, an extremely simple and powerful auxiliary mechanical brake is provided in combination with the fluid-operated service brake.

While the form of brake just described is primarily intended for service actuation by a hydraulic fluid, the annular cylinder and piston construction may be modified by enlarging the same so as to provide a greater piston chamber area, and the sealing means appropriately modified in such a manner as to render the same operable by other fluid mediums such as air.

A modified form of brake, as shown in Figs. 8 through 11, illustrates such a pneumatic brake with still further modifications which render the modified brake more readily adaptable to heavy duty uses. Where the elements correspond to those previously described, the reference characters are primed, but new reference characters are applied to the modified elements.

This modified brake includes a rotatable housing 1' formed of complemental inboard and outboard housing sections 2' and 3', these housing sections being secured together by a suitable number of bolts 4'. Interposed between the housing sections are a plurality of shims 66 which are secured in position by the bolts 4'. To the outboard side of the housing, the bolts 4' secure a marginal flange 67 of a belled mounting hub 68 having a flange 5' adapted to be secured to a wheel-mounting flange 6' of a hub 7', with a centering pin 8' and screws 9' utilized for this purpose, as well as for securing a wheel 10' to the flange 6'.

The housing sections 2' and 3' are preferably cast of aluminum, and the inner radially extended friction surfaces 2", 3" are preferably formed of a wear-resistant material such as grey iron, steel or the like, and are secured to the inner faces of the housing in any suitable manner.

The mounting or adapter plate 12' which supports the inner double-disc assembly 18' in the housing is somewhat similar to the above-described adapter plate 12 of the other form of brake, but it is heavier and stronger, as would be required for use on heavy-duty equipment. Its inner marginal portion is secured to the flange 13' of the axle assembly by means of a suitable number of bolts 14', and a separate closure or splash plate 71 has an inner marginal flange 72 clamped between the adapter plate 12' and the flange 13' by the screws 14'. This closure plate also has an outer marginal flange 12" projecting in between annular marginal flanges 1" and 1'" on the inboard housing section 2', these flanges 1" and 1'" constituting two of a plurality of cooling ribs 73 formed on the outer faces of both housing sections.

The adapter plate 12' has a plurality of radially extended angularly spaced supporting lugs 74 thereon, and as seen in Fig. 8, these lugs are preferably four in number and are extended on radial center lines displaced 90° with respect to one another. Each lug 74 is formed with an arcuate bearing surface 75 on the outer end thereof and a pair of parallel sides 15' and 16'.

Freely slidably mounted on the lugs 74 is the inner double-disc assembly 18', this assembly including an inboard disc 19' and an outboard disc 20' respectively having friction lining segments 19" and 20" thereon. Return springs 21' having hooked ends 22' engaged in openings 23' in the inner marginal edge of the respective discs are utilized to hold the discs in assembled relation, with camming balls 31' confined therebetween and seated in opposed, ramped seats 32'. The discs 19' and 20', in their inner margins, are respectively provided with a number of radial depressions 69 and 70 corresponding in number to the lugs 74. Each radial depression 69 in the inboard disc 19' provides this disc with an anchor shoulder or lug 25' for anchoring abutment with the side 15' of the respective lugs 74, and further provides this disc with a shoulder 76 spaced from the shoulder or anchor 25' a distance greater than the breadth of the lugs 74. Correspondingly, each radial depression 70 in the outboard disc 20' provides this disc with an anchor shoulder 26' and a shoulder 77 spaced therefrom.

Thus, when the discs are shifted axially into engagement with the opposed inner faces of the housing, one disc or the other will be free for rotation relative to the other so as to allow self-energization of the brake by the action of the balls 31'. However, such relative rotative movement is limited by the shoulders 76 and 77 on the respective discs, and the significance of such an arrangement will be more fully explained as the description progresses.

In this modified form of brake, the fluid actuated means is more particularly adapted for operation by air or the like, although it will be obvious that it could be hydraulically operated if desired. In this connection, the outboard disc 20' is provided on its inboard side with an outer marginal flange 78 forming one side of an annular piston chamber 35', and adjacent to its inner margin, this disc is also provided with another annular flange 79 which is in opposed, parallel relation to the flange 78 and forms the other side of the piston chamber 35'.

The annular piston 37' in this embodiment is integral with the disc 19' and is formed by an annular projection 82 on the disc body. This projection 82 is made so as to freely fit into the piston chamber 35', and at its outboard end is provided with a pair of marginal, circumferential seats 83, 83 in which are seated a pair of annular expansible seals or gaskets 84, 84 of resilient material and of substantially U-shaped cross-section. Each seal 84 has its open end disposed towards the outboard disc 20', and an annular coiled spring is located within the seal, as is customary in this type of seal.

Pressure fluid is admitted into the piston chamber 35' through an inlet port 41' extending diagonally from the piston chamber to a cylindrical neck 41" which is provided with a threaded opening 40' for receiving a fitting (not shown), the closure plate 71 being provided with an opening 40" through which the fitting may extend for coupling to an air line or other source of pressure fluid supply.

Within the piston chamber 35', the opposed faces of the discs 19' and 20' are respectively provided with an annular recess or groove 81 and a complemental annular boss or projection 80 extending into this groove, and the ramped seats 32' for the balls 31' are formed in the opposed faces of the annular boss and groove. Thus, the energizing balls 31' are located in the piston chamber itself.

In addition, automatic adjusters 46' are located within the piston chamber 35'. These adjusters substantially correspond with those previously described, except that the lug or projection 48' is secured in a recess 85 in the disc 20', rather than being cast integrally therewith. The projection 48' has a supporting base 86 which is seated in the recess 85, and screws 87 or the like secure the base 86 in place. In addition, the face of the inboard disc 19' which is in opposed relation to the recess 85, is formed with a generally rectangular recess 88 having an end wall 47'' which constitutes an abutment for the lead end 55' of the adjuster screw 50', and the opposite end wall 47'' of the recess 88 constitutes an abutment for the head 51' of the adjuster screw. Adjacent to the abutment 47'', the recess 88 is formed with an off-set recess 89 into which the resilient spring or dog 53' projects so as to engage the serrations 52' on the screw head 51'.

The operation of this heavy-duty brake, in most respects, is exactly the same as that of the first-described brake. However, certain modifications of the structure cause certain variations in the operation of this brake, as will become apparent from the following explanation.

Air under pressure admitted into the piston chamber 35' will spread the discs axially apart and into frictional engagement with the opposed friction faces 2'' and 3''. Assuming the brake shown to be on the right-rear wheel of a vehicle, and assuming the housing to be rotating in a counter-clockwise direction as viewed in Fig. 8, this being the forward direction, as indicated by the arrow, the anchor lugs 26' on the outboard disc 20' anchor on the sides 16' of supporting lugs 74, while the inboard disc 19' becomes energized by the drag torque of the housing and the camming action of the balls, thus positively spreading the discs axially into powerful braking engagement with the housing.

Conversely, when the housing is rotating in a reverse direction, or clockwise as viewed in Fig. 8, the anchor lugs 25' on the inboard disc 19' will anchor on the sides 15' of the supporting lugs. It is to be understood, however, that by merely reversing the relative positions of the anchor lugs on the respective discs, the inboard disc could be made to anchor during forward braking and the outboard disc made to anchor during reverse braking, if preferred.

Adjustment of the running clearance of the brake is automatically accomplished regardless of the direction of rotation of the housing, in identically the same manner as hereinbefore described, but the over-all extent of adjustment is limited by the extent of relative rotation of which the discs are capable. Therefore, after the brake linings have worn down a sufficient amount as to allow the shoulders or lugs 76 and 77 on the respective discs 19' and 20' to engage the side walls 15' and 16' of the lugs 74, further adjustment of the brake by the automatic adjusters 46' is prohibited.

However, at the same time, self-energization of the brake is precluded because the anchored disc 19' or 20', as the case may be, cannot clock with the housing; nor can the other disc clock with the housing, because the lugs 76 or 77, as the case may be, will anchor the normally energizing disc. Thus, the relative rotation of the discs would not be sufficient to cause the balls 31' to cam the discs into braking engagement with the housing in the manner of a self-energizing action; but the discs will still be free for axial separation responsive to fluid pressure in the piston chamber 35', and the brake will remain operative, although its braking capacity will be considerably diminished. This diminution of the braking capacity serves as a warning that the friction linings have worn down.

Upon such a warning, one of the shims 66 may be removed and the adjuster 46' re-set to a starting position. These operations may be repeated throughout the entire life of the friction linings, and this, along with the uniform wear of the linings caused by uniform pressure about their entire circumference, permits the use of linings of extra thickness, with attendant long life, and without necessitating frequent re-lining of the brake.

In addition, the automatic adjustment of this brake limits the relative rotation of the discs during brake application and brake release movements thereof to the very minimum which is necessary to allow ample release or running clearance of the brake; and in so limiting these movements of the discs, the life of the seals 84 is substantially prolonged, since movements of the seals in both axial and rotative directions in the piston chamber is maintained at an absolute minimum, thus eliminating undue wear of the seals.

It will now be clearly seen that the two forms of brakes which are herein described attain all of the objectives of the present invention, and while the details thereof are herein specifically described and shown, the invention is not limited thereto, since changes and alterations may be resorted to without departing from the spirit thereof as defined in the appended claims.

I claim:

1. A friction device of the class described, comprising a rotatable member, a pair of relatively axial and relatively rotatively shiftable friction discs, means freely mounting said discs adjacent to said rotatable member, actuator means for shifting the discs into frictional engagement with said rotatable member, means for selectively anchoring either disc depending upon the direction of rotation of said rotatable member, and drag torque responsive means for forcing said discs into engagement with said rotatable member responsive to rotation of the other disc relative to the anchored disc, said actuator means comprising fluid pressure-operated means extended completely annularly about the axis of the respective discs, and self-adjuster means operative responsive to rotation of either of said discs with said rotatable member for maintaining a constant release clearance between said discs and said rotatable member, said self-adjuster means including a one-way shiftable member shiftably carried by one of said discs, and a pair of abutments carried by the other of said discs and disposed for abutting engagement with the opposite ends of said one-way shiftable member for shifting the one-way shiftable member upon rotation of either disc relative to the other and for limiting return movements of said discs.

2. A friction device as defined in claim 1, wherein the discs are provided with a pair of self-adjuster means as aforesaid arranged in diametrically opposite positions, each of said self-adjuster means having its abutments carried by one disc and its one-way shiftable member carried by the other disc, and said one-way shiftable member of each adjuster being carried by the same disc.

3. A friction device as defined in claim 1, wherein the fluid pressure-operated means includes an annular piston chamber of relatively large cross-section in one of said discs, and an annular piston projecting from the other disc and into said piston chamber.

4. A friction device as defined in claim 1, wherein the fluid pressure-operated means includes an annular piston chamber of relatively large cross-section in one of said discs, and an annular piston projecting from the other disc and into said piston chamber, and said drag torque responsive means comprises camming means disposed within said piston chamber.

5. A friction device as defined in claim 1, wherein the fluid pressure-operated means includes an annular piston chamber of relatively large cross-section in one of said discs, and an annular piston projecting from the other disc and into said piston chamber, and said drag torque responsive means comprises a plurality of balls disposed within said piston chamber and engaged with oppositely inclined ramps on the respective discs.

6. A friction device as defined in claim 1, wherein the fluid pressure-operated means comprises a pair of outstanding annular flanges on one of said discs, said flanges forming a piston chamber therebetween, and a piston carried by the other disc and projecting into said piston chamber.

7. A friction device as defined in claim 1, wherein the fluid pressure-operated means includes a piston chamber in one of said discs and a fluid pressure-responsive piston slidably mounted in said piston chamber, said self-adjuster means being disposed in said piston chamber.

8. A friction device as defined in claim 1, wherein said mounting means comprises a plate adapted to be connected to a stationary member, said plate having at least one pair of radially extended supporting lugs, said lugs and the inner periphery of the discs having complemental annularly extended bearing faces for slidably supporting the discs on the lugs.

9. A friction device as defined in claim 1, wherein one of the discs is provided with a lug disposed in opposed spaced relation to a lug on the mounting means, and one of the lugs aforesaid is provided with resilient means abutting on the other lug to normally maintain the last-mentioned disc in anchored position against the lug on the mounting means.

10. A friction device as defined in claim 1, wherein the mounting means comprises a plate adapted to be connected to a stationary member, said plate having two pairs of supporting lugs arranged in diametrically spaced relation, with a lug of each pair disposed in opposed adjacent spaced relation to a lug of the other pair, said lugs and the inner periphery of said discs having complemental bearing surfaces for slidably supporting the discs on said lugs, and the means for anchoring the respective discs comprises a pair of diametrically spaced anchor lugs on each disc, the anchor lugs on one disc being disposed for anchoring engagement with one pair of supporting lugs, and the anchor lugs on the other disc being disposed for anchoring engagement with the other pair of supporting lugs.

11. A friction device as defined in claim 1, wherein the mounting means comprises a plate adapted to be connected to a stationary member, said plate having two pairs of supporting lugs arranged in diametrically spaced relation, said lugs and the inner periphery of said discs having complemental annularly extended bearing surfaces for slidably supporting the discs on said lugs, and the means for anchoring the discs comprises an anchor lug carried by each of said discs adjacent to each pair of the supporting lugs, the anchor lugs on one disc being disposed on one side of the respective pairs of supporting lugs, and the anchor lugs on the other disc being disposed on the other side of said pairs of supporting lugs.

12. A friction device as defined in claim 1, wherein the mounting means comprises a plate adapted to be connected to a stationary member, said plate having two pairs of supporting lugs arranged in diametrically spaced relation, said lugs and the inner periphery of said discs having complemental bearing surfaces for slidably supporting the discs on said lugs, and the means for anchoring the discs comprises an anchor lug carried by each of said discs adjacent to each of the supporting lugs, the anchor lugs on one disc being disposed on one side of the supporting lugs, and the anchor lugs on the other disc being disposed on the other side of said supporting lugs, said discs having means engageable with the supporting lugs for limiting the range of relative rotation of said discs during operation.

13. A friction device as defined in claim 1, wherein the mounting means comprises a plate adapted to be connected to a stationary member, said plate having two pairs of supporting lugs arranged in diametrically spaced relation, said lugs and the inner periphery of said discs having complemental bearing surfaces for slidably supporting the discs on said lugs, and the means for anchoring the discs comprises an anchor lug carried by each of said discs adjacent to each of the supporting lugs, the anchor lugs on one disc being disposed on one side of the supporting lugs, and the anchor lugs on the other disc being disposed on the other side of said supporting lugs, said discs each having an abutment disposed in opposed relation to each anchor lug on the disc and disposed on the side of the respective supporting lugs opposite the anchor lugs to limit the range of relative rotation of the discs during operation.

14. A friction device as defined in claim 1, wherein the mounting means is provided with diametrically spaced supporting lugs, said supporting lugs and the inner periphery of each of the discs having complemental bearing surfaces slidably supporting the discs on said mounting means, said mounting means having a spring seat thereon, and a spring interposed between said seat and one of said discs, said spring acting on the discs to maintain the discs in contact with certain of the supporting lugs to prevent rattling of the discs.

15. A disc brake of the class described, comprising a rotatable housing having opposed radially extended friction surfaces, an adapter plate at one side of said housing, said adapter plate having supporting means projecting into said housing, a pair of discs rotatably and axially shiftably mounted on said supporting means, cooperative anchor means on the discs and on the supporting means respectively for anchoring either disc against rotation, depending upon the direction of rotation of the housing, service actuating means between the discs for shifting the discs axially into engagement with the housing, energizing means for forcing the discs axially into harder engagement with the housing responsive to relative rotation of the discs, means resiliently biasing said discs axially towards each other, and auxiliary actuating means pivotally mounted on one of the discs and operatively connected to the other disc for shifting the discs relatively rotatively to engage the brake through the energizing means.

16. A disc brake of the class described, comprising a rotatable housing having opposed radially extended friction faces, an inner double-disc assembly disposed within said housing, fluid actuated means for shifting said discs axially apart and into engagement with the friction faces of the housing for service brake application, self-energizing means for forcing the discs into harder engagement with said friction faces responsive to relative rotation of the discs, and auxiliary mechanical means for shifting said discs rotatively relative to each other to spread the discs axially into engagement with said friction faces through said self-energizing means.

17. A disc brake of the class described, comprising a rotatable housing having opposed radially extended friction faces, an inner double-disc assembly mounted in said housing, said inner disc assembly having means for spreading said discs axially apart into engagement with said friction faces responsive to relative rotation of the discs, a lever pivotally mounted at one of its ends on one of said discs, a link pivotally connected at one of its ends to said lever at a point intermediate the ends of the lever, the other end of the link being pivotally connected to the other disc at a point circumferentially spaced from the point of connection of the lever to the first disc, and operating means for rocking said lever on its pivotal mounting to shift said discs rotatively in opposite directions.

18. In a disc brake of the type having an inner double-disc assembly mounted on a stationary support, with the discs free for relative rotative and axial shifting movements and having friction surfaces shiftable into and out of engagement with opposed, axially spaced friction surfaces of a brake housing, actuating means for shifting said discs into initial braking engagement with said friction surfaces, and said inner disc assembly also having means for alternately energizing either of the discs, depending upon the direction of rotation of the housing, while the other disc anchors on the stationary support, that improvement wherein the discs are provided with means engageable with the supporting means for preventing further energization of either disc when the friction surfaces aforesaid attain a predetermined wear limit, while allowing unenergized operation of the brake.

References Cited in the file of this patent

UNITED STATES PATENTS

| | | |
|---|---|---|
| 2,375,854 | Lambert | May 15, 1945 |
| 2,387,039 | Parrett | Oct. 16, 1945 |
| 2,526,149 | Myers et al. | Oct. 17, 1950 |
| 2,563,759 | Tiscornia et al. | Aug. 7, 1951 |
| 2,595,860 | Lambert et al. | May 6, 1952 |
| 2,633,941 | Zindler | Apr. 7, 1953 |
| 2,633,943 | Lambert | Apr. 7, 1953 |

FOREIGN PATENTS

| | | |
|---|---|---|
| 883,406 | France | Mar. 23, 1943 |
| 951,406 | France | Apr. 18, 1949 |
| 711,795 | Germany | Feb. 22, 1942 |
| 804,068 | Germany | Apr. 16, 1951 |